United States Patent [19]

Nazarian et al.

[11] Patent Number: 4,685,007
[45] Date of Patent: Aug. 4, 1987

[54] DISK DRIVE WITH TRACK ZERO LOCATION SYSTEM

[75] Inventors: Ara W. Nazarian, Hollywood; Donald G. Stupeck, Canoga Park, both of Calif.

[73] Assignee: Computer Memories, Incorporated, Chatsworth, Calif.

[21] Appl. No.: 564,021

[22] Filed: Dec. 21, 1983

[51] Int. Cl.[4] .......................... G11B 21/08; G11B 5/55
[52] U.S. Cl. ...................................... 360/78; 318/685; 318/696
[58] Field of Search ...................... 360/78, 77, 75, 106, 360/109; 318/561, 685, 696; 369/32, 33

[56] References Cited

U.S. PATENT DOCUMENTS

| | | | |
|---|---|---|---|
| 3,298,009 | 1/1967 | Domich et al. | 360/78 |
| 3,789,378 | 1/1974 | Bonzano et al. | 360/77 |
| 3,977,024 | 8/1976 | Haneji et al. | 360/78 |
| 4,048,660 | 9/1977 | Dennison et al. | 360/77 |
| 4,136,365 | 1/1979 | Chick et al. | 360/78 |
| 4,142,209 | 2/1979 | Hedlund et al. | 360/77 |
| 4,151,571 | 4/1979 | Cardot et al. | 360/77 |
| 4,157,577 | 6/1979 | Porter, Jr. et al. | 360/77 |
| 4,163,265 | 7/1979 | van Herk et al. | 360/77 |
| 4,195,320 | 3/1980 | Andresen | 360/78 |
| 4,217,612 | 8/1980 | Matla et al. | 360/78 |
| 4,354,210 | 12/1982 | Droux | 360/77 |
| 4,390,912 | 6/1983 | Hertrich et al. | 360/78 |
| 4,394,696 | 7/1983 | Yoshimaru | 360/78 |
| 4,395,742 | 7/1983 | Ostroff | 360/78 |
| 4,396,959 | 8/1983 | Harrison et al. | 360/77 |
| 4,405,956 | 9/1983 | Marshall | 360/78 |
| 4,488,187 | 12/1984 | Alaimo | 360/77 |

OTHER PUBLICATIONS

IBM TDB, vol. 19, No. 3, "Track Location Correction Mechanism for Magnetic Disks" Hanson et al., Aug. 1976, pp. 1039-1041.
IBM TDB, vol. 19, No. 4, "Head-to-Track Synchronizing Mechanism for Magnetic Disks" Porter et al., Sep. 1976, pp. 1393-1395.
IBM TDB, vol. 19, No. 6, "Self-Calibrating Disk Storage Apparatus" Griffiths et al., Nov. 1976, pp. 1991-1992.

Primary Examiner—Raymond F. Cardillo
Assistant Examiner—Steven R. Garland
Attorney, Agent, or Firm—Spensley Horn Jubas & Lubitz

[57] ABSTRACT

A low cost disk drive system includes track zero information located in a single sector on the disk surface. The information is comprised of a first type of signal located in tracks to one side of an arbitrary reference track and a second type of signal located in the tracks to the other side of the arbitrary reference track. The magnetic head of the disk drive system is moved radially with respect to the disk and the transition between the signals detected in order to locate the head at the reference track.

8 Claims, 5 Drawing Figures

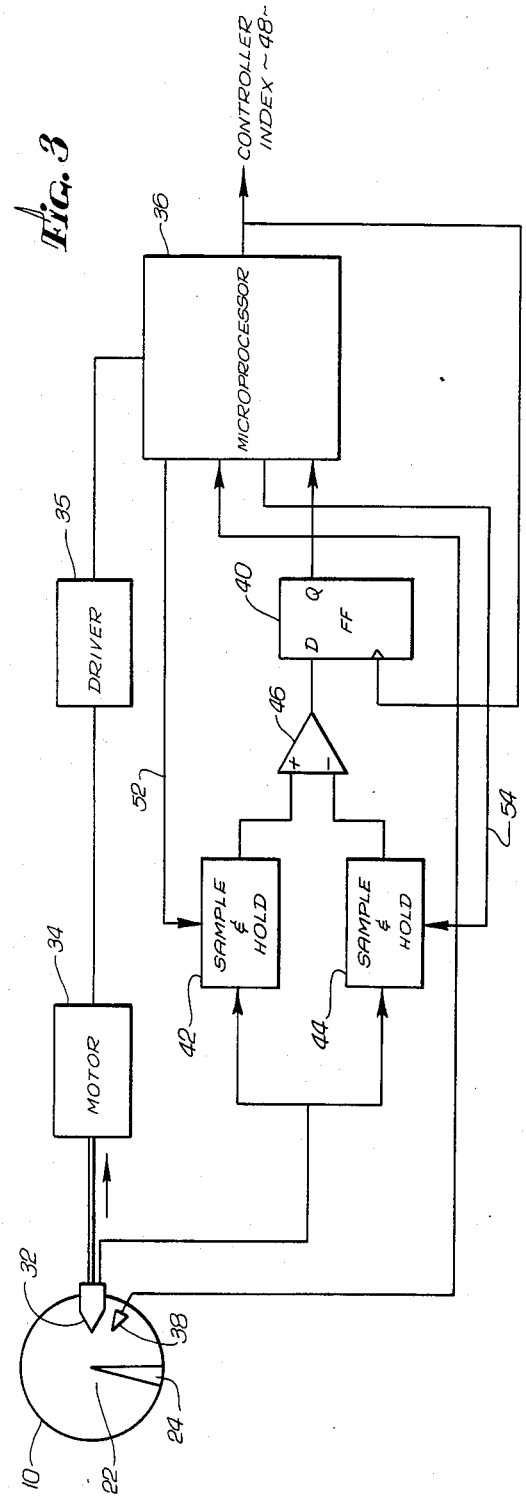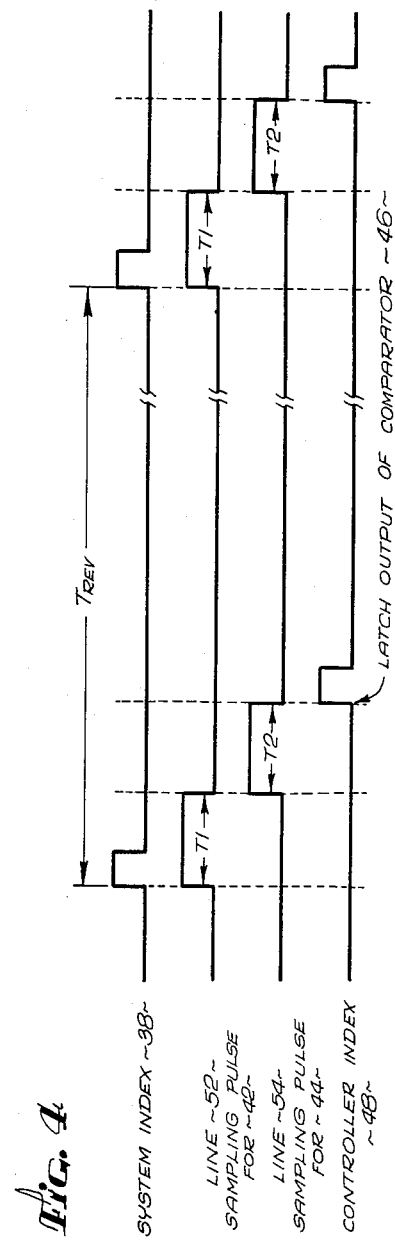

4,685,007

DISK DRIVE WITH TRACK ZERO LOCATION SYSTEM

BACKGROUND OF THE INVENTION

1. Field of the Invention

The present invention relates to disk drive systems of the type having a plurality of concentric data tracks located on a rotatable disk. More particularly, the present invention relates to a system for accurately positioning a magnetic head with respect to a desired reference track. Still more particularly, the present invention relates the provision of a track locating system in a low cost disk drive which is compatible with external controllers.

2. Description of the Prior Art

Prior art low cost disk drive systems typically employ an open loop positioning system for locating a magnetic transducer, or head, with respect to the data tracks on a disk. In one common system, a stepper motor is used to position the head with respect to the data tracks, and the number of steps of the motor with respect to a reference position is monitored to determine the location of the head. An optical sensor senses a position flag coupled to the drive capstan of the motor to provide an indication of when the head is at a reference track, arbitrarily designated track zero. Whenever power is applied to the disk drive system, the head position is initially unknown. The motor is stepped until the opitical transducer provides an indication that the motor has positioned the head at track zero. A microprocessor is employed to keep track of the number of subsequent steps taken by the motor to determine head position with respect to the reference track.

The prior art mechanical system described above has several disadvantages associated with it. Primary among these is that the optical sensor and accompanying components are quite expensive. Furthermore, the sensor requires a critical adjustment in order to ensure that it accurately indicates when the head is positioned at track zero. It is an object of the present invention to eliminate the need for an expensive optical sensor and associated components. It is a further object of the invention to eliminate any mechanical components which require critical adjustments in order to provide accurate track zero information.

In the system described above, the entire disk surface is available for writing data. An index pulse is generated once per revolution of the disk, and an external controller allows data to be written on a selected track of the disk between successive index pulses. More specifically, the controller writes a predetermined amount of serial trasmitted data between successive index pulses. The rate at which the data is transmitted is dictated by industry standard and, hence, the amount of data to be written between successive index pulses to the controler is predicated by the nominal psuedo-standard disk speed of 3600 revolutions per minute. It is permissible and commonly practiced within the disk drive industry to alter slightly the disk speed relative to 3600 revolutions per minute and hence the overall amount of data to be written.

More complex disk drive systems often employ servo information located on the disk surface to control track seeking and track following (centering) operations. Often, the disk includes a plurality of servo sectors, and each data track includes a unique address code which is read to determine the position of the head. Such systems are disclosed in U.S. Pat. Nos, 4,195,320 to Andresen, 4,163,265 to Van Herk et al., 4,151,571 to Cardot et al., 4,048,660 to Dennison et al. (a unique track address for each track within a six track region) and 4,354,210 to Droux. Such systems require relatively complicated decoding circuits in order to determine the track number. In addition, the format of data on the disk must be predetermined due to the existance of multiple servo sectors.

Additonal disk drive systems which include track locating systems are disclosed in U.S. Pat. Nos. 4,405,956 to Marshall, 4,390,912 to Hertrich et al and 4,396,959 to Harrison et al. In Marshall, two pairs of positive and negative servo marks are recorded in a plurality of servo sectors. The servo marks are monitored to provide tracking signals which are ninety degrees out of phase, and trigonometric identities are employed to determine track location. In Hertrich, alternating positive and negative servo bursts in sectors in data tracks are employed to determine track location. In addition, constant level servo bursts are recorded in inner and outer guardbands adjacent to the data tracks to indicate when the head is outside of the data tracks. In Harrison, a single sector of servo information is provided on the disk and controls track centering functions. Track locating is accomplished by an encoder coupled to the head positioner motor, with zero crossings of the encoder corresponding to various data tracks. In the Harrison patent, the single servo sector is masked from the user by reducing the rotational speed of the disk drive. This maintains the standard writing time period and thus enables the data format to be selected by means of an external controller. The servo sector does not contain any track zero information. Rather, this information is derived from the external position transducer coupled to the head actuator.

SUMMARY OF THE INVENTION

The present invention is directed to a low cost disk drive system in which track zero information is contained in a sector located on the disk. No external position transducer is required, with the result being that cost is reduced and critical adjustments eliminated. Signals of a first type are recorded within a single sector on the disk on all tracks to the outside of a predetermined track. Signals of a second type are recorded on tracks to the inside of the predetermined track. The predetermined track (and thus track zero, which may or may not correspond to the predetermined track) is located by moving the head with respect to the tracks and detecting the transition between the first and second types of signals. Tracks are then located by counting the number of subsequent steps of the head positioning motor.

The rotational speed of the disk drive is reduced with respect to the standard 3600 rpm speed in order to mask the sector from the user and hence provide the same writing time and amount of data capacity between successive index pulses. The disk drive may thus be used with external controllers, with the format of data written on the disk being determined by the user.

BRIEF DESCRIPTION OF THE DRAWINGS

The invention will be described with reference to the accompanying drawings, wherein:

FIG. 3 is a block diagram of the present invention:

FIG. 4 is a timing diagram illustrating the operation of the present invention.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figures 1, 2:
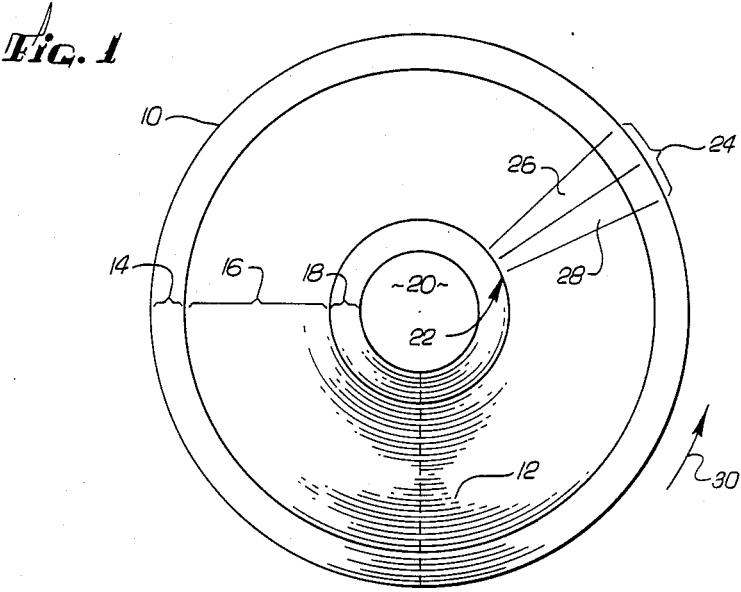
FIG. 1 is a plan view of a disk showing the arrangement of the track zero information.
FIG. 2 is a diagram illustrating the signals recorded on the disk to facilitate location of track zero.

Referring to FIG. 1, a magnetic disk 10 employed in a disk drive system includes a plurality of concentric data tracks 12. The data tracks are divided into an outer guard band 14, an inner guard band 16 and a data band 18. The disk rotates on a spindle 20 which contains an index mark 22. A track zero sector 24 is divided into first and second zones 26 and 28. The disk rotates in a direction indicated by an arrow 30.

The signals recorded in the sector 24 are illustrated in FIG. 2. Generally, each zone 26 and 28 includes a signal designated either plus or minus which is recorded on each data track of the disk. In the preferred embodiment of the invention, a plus indicates a recorded signal burst whereas a minus indicates an erased zone. The initial three data tracks, arbitrarily designated tracks 0, 1 and 2, and all tracks in the outer guard band 14 contain a first signal type in the sector 24, i.e., a plus signal in the zone 26 followed by a minus signal in the zone 28. All of the tracks from track 3 inward are recorded with a second type of signal in the sector 24, i.e., a minus signal in the zone 26 followed by a plus signal in the zone 28. Thus, a first type of signal is recorded in each track to the outside of a predetermined track and a second type of signal is recorded in the predetermined track and each track to the inside of the predetermined track.

Referring to FIG. 3, a magnetic transducer 32 for reading information from the disk 10 is radially movable with respect to the disk by means of an actuator 34, which in the present embodiment is a stepper motor. The motor is controlled by means of a driver 35, which is in turn controlled by a control logic 36, typically a microprocessor and referred to henceforth as such. The microprocessor 36 sends commutation commands to the motor to cause it to step and moves the head 32 either inwardly or outwardly with respect to the disk 10.

Upon start-up, the head 32 may be positioned anywhere with respect to the data tracks on the disk. Thus, an initial operation is performed to position the head at the reference track, i.e., track zero. The head may then be moved to selected data tracks by causing the motor to step and counting the number of steps taken (i.e. monitoring the commutation of the motor) Thus, after the head is positioned at track zero, the movement and determination of the position of the head is accomplished in an open loop fashion.

The index mark 22 is detected by means of a sensor 38 as is known in the art. The detection of the index mark indicates the rotational position of the disk with respect to the head. An index signal from the sensor 38 is supplied to the microprocessor 36. In response to the index signal, the microprocessor generates sampling signals to sample and hold circuits 42 and 44. The timing of the control signals to the sample and hold circuits is such that the sample and hold 42 will read signals from zone 26 of the sector 24 and the sample and hold 44 will read signals from zone 28 of the sector 24. The held signals are compared by means of a comparator 46 and applied to the data input of the a zero track flip-flop 40. In the present embodiment of the invention, the sampling will occur immediately after the occurence of a subsequent index pulse, and at the end of sector 24 a controller index 48 is generated by the microprocessor which will clock the flip flop 40, thus transferring the output of the comparator 46 to the microprocessor 36.

The output of the comparator 46 indicates whether the transducer 32 has sensed the first type of signal or the second type of signal. If in a particular rotation of the disk, the transducer was located over the outer guard band 14 or tracks 0, 1 or 2, the sample and hold 42 will read a plus signal and the sample and hold 44 will read a minus signal. As a result, the output of the comparator 46 (and thus flip flop 40) will be high. On the other hand, if the transducer is positioned over a data track (other than tracks 0, 1 or 2) or an inner guard band track, the sample and hold 42 will receive a negative signal on the sample and hold 44 a positive signal. As a result, the output of the comparator 46 and flip flop 40 will be low. Thus, the state of the flip flop 40 indicates whether the head 32 is positioned over a track to the outside or inside of a predetermined track (in this case track 2 outward or track 3 inward). This information is used by the microprocessor during an initialization routine to determine when the head is positioned at track zero.

Referring to FIG. 4, the timing of various operations of the sytem will be described. The system index signal provided by the sensor 38 will occur once per revolution of the disk 10. This signal is provided to the microprocessor 36 which generates a controller index signal 48 to an external controller (not shown). Typically, a disk will rotate at 3600 rpm, and the enable signal will be of a duration corresponding to one rotation of the disk, i.e., 16.67 ms. The disk drive system of the present invention maintains this duration despite the inclusion of the sector 24 on the surface of the disk. This is accomplished by rotating the disk at a somewhat reduced rate (e.g., 3560 rpm) with respect to the nominal 3600 rpm rate. As a result of the reduced rotation rate, the controller will be unaware of the existence of the sector 24, since the enable signal will end prior to the head being positioned over the sector 24. Furthermore, the next index pulse will not occur until after the sector 24 has passed the head.

Following the receipt of the system index the microprocessor will generate a control signal 52 for a time period T1 to cause the sample and hold 42 to acquire data. The time period T1 corresponds to the time period that the zone 26 under/at head 32. Similarly, upon completion of time period T1, control signal 54 is activated for a time period T2 which will cause the sample and hold 44 to acquire data. The signal 54 corresponds to the zone 28 being located under/at head 32. The comparator 46 will compare the contents of the sample and hold circuits 42 and 44. A controller index 48 which is generated at the end of time period T2 will clock the flip flop 40 to transfer the output of the comparator 46 to the microprocessor 36. Thus, the signal in the sector 24 is monitored once per revolution of the disk 10 and the polarity of the signal indicated at the output of the flip flop 40.

Figure 5:
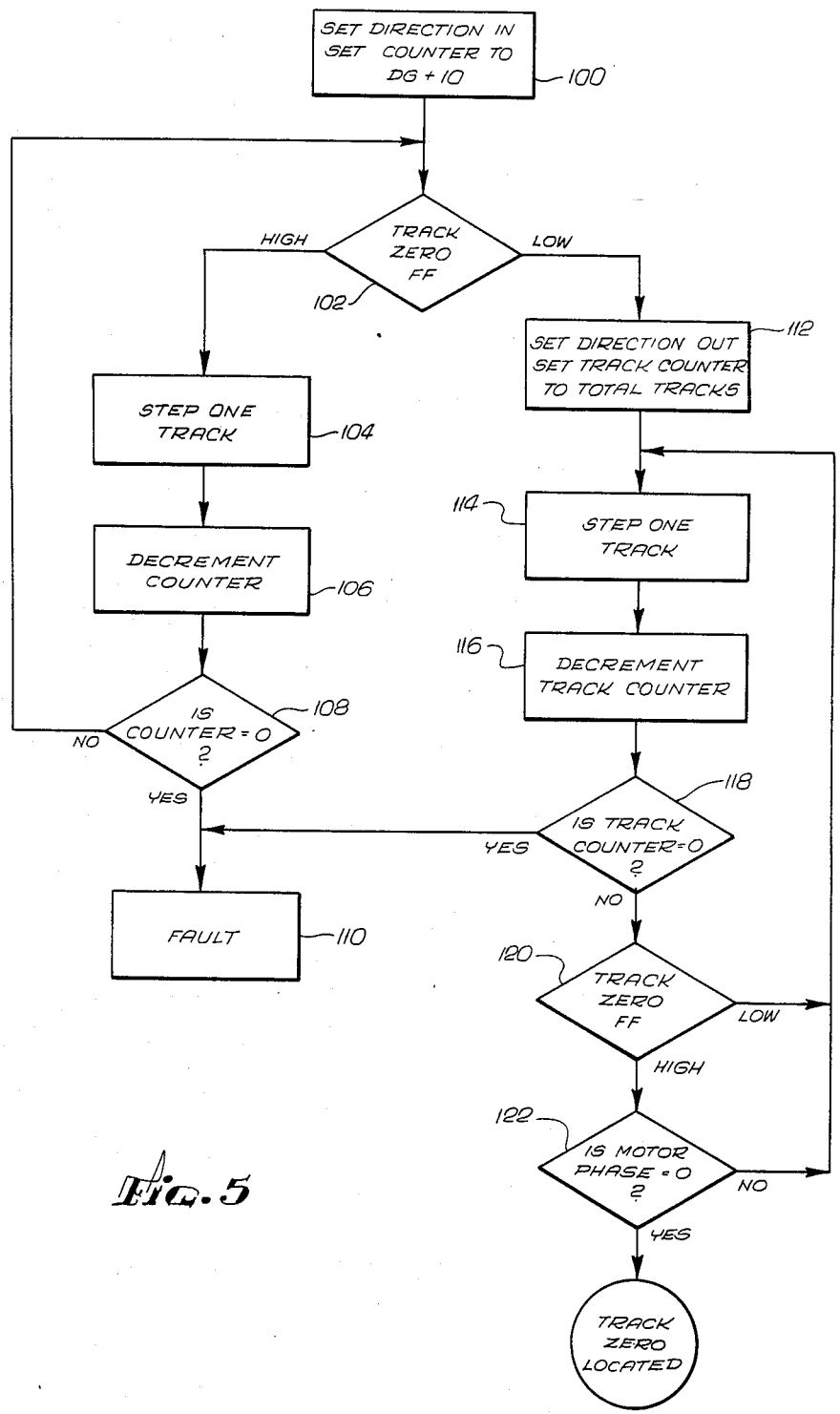
FIG. 5 is a flow chart of the track zero locating operation of the present invention.

The track zero location operation as controlled by the microprocessor 36 will be described with reference to FIG. 5. Upon the application of power to the system, the head 32 will be located at some unknown point with respect to the disk 10. The initial step in the track zero location sequence is to set the head motion direction to move the head inward and to set an internal counter in the microprocessor to the number of tracks in the outer guard band 14 plus ten, step 100. The microprocessor then checks the state of the track zero flip flop 40, step 102. If the flip flop output is high, it indicates that the head is located within the outer guard band 14 or tracks 0, 1 or 2. The system then steps the head one track, step 104, and decrements the counter by one, step 106. The state of the counter is then checked to determine if its count is zero, step 108. If so, it is an indication that the track zero flip flop output was still high even though the head had stepped inward by ten tracks greater than the number of tracks in the outer guard band. If so, the head should be located within the data track section 18. Since the track zero flip flop output should be low in this instance, a zero count at step 108 indicates a fault in the system, which is indicated at step 110. If the counter output is not zero, the sequence is repeated beginning at step 102 until the track zero flip flop output is low, indicating the head has moved from track 2 to track 3 (or that the head was initially located to the inside of track 2).

When the output of the track zero flip flop is low, the head is located to the inside of track 2. The microprocessor sets the head direction to move the head in an outward direction and sets an internal track counter to the total number of tracks on the disk (the sum of the tracks within sections 14, 16 and 18), step 112. The microprocessor then causes the head to step one track and decrement the track counter by one, steps 114 and 116. The count of the track counter is then checked to see if it is equal zero, step 118. If so, a fault exists, step 110. If the count is not zero, the state of the track zero flip flop is again checked, step 120. If its output is still low, it is an indication that the head is still to the inside of track 2, and the process repeats beginning at step 114.

The output of the track zero flip flop will go high when the head moves from track 3 to track 2 (FIG. 2). In the present embodiment of the invention, the motor has different commutation states corresponding to groups of four tracks, e.g., the commutation state of the motor will be different for track zero than it is for tracks 1 and 2 and the innermost track of the guard band 14. The commutation state corresponding to track zero is arbitrarily designated phase zero. After the head has moved from track 3 to track 2, thus causing the output of the track zero flip flop to go high, the commutation phase of the motor is checked to determine if it is zero, thus indicating that the head is located at track zero, step 122. If the motor phase is not zero, the process is repeated beginning at step 114 until the motor phase is zero and the head is located at track zero. In essence, the transition status of the track zero flip flop provides the coarse information while the motor's commutation state provides the fine position information relative to identifying the reference track zero.

It should be noted that the transition from the first type of signal to the second type of signal could occur in any one of various tracks near track zero, depending upon the direction of stepping to locate track zero and the particular control program employed. A system could be designed in which the transition occurs between track 1 and track 0, thus eliminating the necessity of checking the motor phase (although it would still be useful to ensure that the head had not overstepped track zero). The fundamental requirement is to provide a transition between two tracks in which a large group of signals to one side of the transition are of a first type and a large group of signals to the other side of the transition are of a second type, wherein the detection of the transition can be utilized to locate the arbitrary reference track zero.

What is claimed is:

1. a magnetic disk system comprising:
an information carrying disk having a plurality of concentric data tracks, said disk having a single sector of reference track information thereon providing an indication of the location of a reference track with respect to the other data tracks, the sector of reference track information including a first signal pattern recorded on each track to one side of the reference track and a second signal pattern different from the first signal pattern recorded on the reference track and each track o the other side of the reference track;
transducer means for reading information from the disk;
actuator means for radially moving the transducer means with respect to the tracks of the disk;
detection means for determining, in response to the reading of reference track information by the transducer means, when the transducer means is positioned at the reference track; and
control means for controlling the actuator means (a) first in response to the detection means to move the transducer means across the tracks of the disk to locate the reference track and (b) second in an open loop fashion after the detection means has determined that the transducer means is positioned at the reference track to move the transducer means to a desired data track.

2. A magnetic disk system as in claim 1 wherein:
the detection means includes identification means for identifying whether the transducer means is reading the first signal pattern or the second signal pattern and processor means for (a) causing the control means to cause the actuator means to radially move the transducer means with respect to the disk, (b) detecting a transition from the reasding of one signal pattern to the reading of the other signal pattern, and (c) determining when the transducer means is located at the reference track as a function of the detected transition.

3. A magnetic disk system as in claim 2 wherein:
the sector of reference track information comprises first and second radial zones, wherein the first signal pattern comprises a signal identified as plus in one zone and a signal identified as minus in the other zone and the second signal pattern comprises a signal identified as minus in said one zone and plus in said other zone; and
the identification means includes first sampling means for sampling signals from the first zone, second sampling means for sampling signals from the second zone and comparison means for comparing the sampled signals to determine if the track at which the transducer means is located contains the first signal pattern or the second signal pattern.

4. A magnetic disk system as in claim 3 wherein the plus signal is comprised of a signal burst and the minus signal is comprised of an erased area.

5. A magnetic disk system as in claim 2 including a control processor, said control processor including the control means and the processor means.

6. A magnetic disk system as in claim 1 wherein the actuator means comprises a stepping motor and wherein the control means provides control signals to commutate the phases of the stepping motor and counts the commutations of the stepping motor to determine displacement of the transducer means from the reference track.

7. A magnetic disk system as in claim 6 wherein the detection means determines where the transducer means is positioned at the reference track in response to both the reading of reference track information and as a function of the commutation state of the stepping motor.

8. A magnetic disk system for use with an external controller, comprising:
- a magnetic information disk having a plurality of concentric data tracks and a single sector of reference track information at the end of the tracks, said sector including a first signal pattern recorded on each track to one side of a predetermined track and a second signal pattern different from the first signal pattern recorded on the predetermmined track and each track to the other side of the predetermined track;
- drive means for rotating the disk;
- transducer means for reading information from the disk and writing information onto the disk;
- index means for providing an index pulse once per revolution of the disk to indicate to the controller that the transducer means is at the beginning of a track, wherein the controller enables the writing or reading of information for a predetermined time period after the occurence each index pulse, wherein the drive means rotates the disk at a substantially constant speed sufficiently slo so that the sector of reference track information is read by the transducer means after the expiration of the predetermined time period;
- actuator means for moving the transducer means radially across the data tracks;
- control means for providing control signals for controlling the actuator means; and
- reference track locating means for causing the control means to control the actuator means to position the transducer means to an arbitrary reference track in response to the reading of information from the sector of reference track information;
- wherein the control means thereafter controls the actuator means in an open loop fashion to position the transducer means at a desired data track.

* * * * *